United States Patent
Chimenti et al.

[11] 3,876,281
[45] Apr. 8, 1975

[54] SUPERRADIANT LASER ILLUMINATOR AND IMAGE AMPLIFIER

[76] Inventors: Robert J. L. Chimenti, 2265 Ocean Pkwy., Brooklyn, N.Y. 11223; Paul Rabinowitz, 10 Foxwood Rd., Old Bethpage, Long Island, N.Y.

[22] Filed: Sept. 13, 1973

[21] Appl. No.: 396,717

Related U.S. Application Data
[62] Division of Ser. No. 185,706, Oct. 1, 1971, Pat. No. 3,786,366.

[52] U.S. Cl. ................ 350/3.5; 350/12; 356/106
[51] Int. Cl. ............................................ G02b 27/00
[58] Field of Search .................. 350/3.5, 12, 13; 331/94.5 C; 330/4.3; 356/106, 109

[56] References Cited
UNITED STATES PATENTS
| | | | |
|---|---|---|---|
| 3,293,565 | 12/1966 | Hardy | 331/94.5 |
| 3,417,345 | 12/1968 | Cabezas et al. | 331/94.5 |
| 3,610,732 | 10/1971 | Mack et al. | 350/3.5 |

*Primary Examiner*—Ronald J. Stern

[57] ABSTRACT

A device is described in which amplified spontaneous emission from a high-gain laser medium illuminates an object through an optical system that also serves to collect the reflected or scattered light from the object and return it through the laser medium to form a highly amplified image. By modification of the optical system and control of the gain factor, the invention can be adapted for various uses including projection or etching of the amplified image on a substrate.

17 Claims, 5 Drawing Figures

SUPERRADIANT LASER ILLUMINATOR AND IMAGE AMPLIFIER

This is division, of application Ser. No. 185,706, filed Oct. 1, 1971, now U.S. Pat. No. 3,786,366.

This invention relates to image amplifiers, and more particularly, to image amplifiers using high gain laser media to provide the image amplification.

One application of image amplifiers is in the field of projection microscoppy. One of the problems of conventional high magnification projection microscopy is that, if the object to be examined is illuminated with sufficient intensity to provide a bright image for projection, there is a risk that the object will be damaged or destroyed by the energy of the illuminating light. One solution to this problem is to reduce the intensity of the illuminating light and to provide an image amplifier in the optical path between the object to be examined and the projection optics of the microscope. If a laser material is to be used as the image amplifier, there is the additional problem of matching the wave length of the illuminating light to the operating wave length of the laser material, as well as the problem of providing proper contrast and adequate resolution over a sufficiently large field of view to provide an amplified image containing a useful amount of information.

It is therefore an object of this invention to provide an improved image amplifier using high gain laser media.

It is also an object of this invention to provide image amplifying apparatus including an illuminator which is matched to the wave length of the image amplifying medium.

It is a further object of this invention to provide image amplifying apparatus having relatively high resolution over a relatively large field of view.

It is a further object of this invention to provide apparatus for producing an amplified image having a contrast ratio which closely corresponds to the unamplified contrast ratio.

In accordance with the above and other objects the present invention provides a laser illuminator and image amplifier including a body of high gain laser material which is of a shape to permit transmission of radiation in a relatively large number of modes. The laser medium is pumped to the point of super-radiance and the emitted partially coherent light is used to illuminate the object to be viewed through a suitable optical system. The same opptical system serves to collect the light reflected or scattered from the object and to return the reflected light through the laser medium to form an image, preferably near the opposite end of the body of laser material. The resulting image is greatly amplified, depending on the gain of the laser material, and, because of the uniform optical characteristics of the laser material, image quality is preserved. An additional lens system for projecting the amplified image may be provided if desired.

An advantage of the present invention is that, with slight modifications of the optical systems, the apparatus can be adapted for direct viewing or projection of the amplified image. Further, the amplified image may be greatly reduced in size by a suitable lens system, and the very intense reduced image may be used to directly etch a variety of materials such as, for example, semiconductor micro-circuits.

Another advantage of the present laser illuminator and image amplifier as compared with other projection systems is that the projected image brightness may be thousands of times greater than the brightness of the light illuminating the object. Thus, living and other sensitive objects can be viewed without destruction in a projection microscope utilizing the present invention.

Another object of the present invention is that if the laser medium is operated in the pulsed mode and the microscopic events to be observed are periodic in nature, the laser pulses may be synchronized to the observed event so as to provide a stroboscopic viewer. In addition, because the laser medium may be operated to provide pulses as short as several nanoseconds in duration, high temporal resolution of relatively fast non-periodic events may be observed with adequate intensity for recording on photographic film.

Other objects and advantages of the present invention will be apparent from the following detailed description and accompanying drawings which set forth by way of example, the principle of the present invention and the best mode contemplated of applying that principle.

Figure 1:
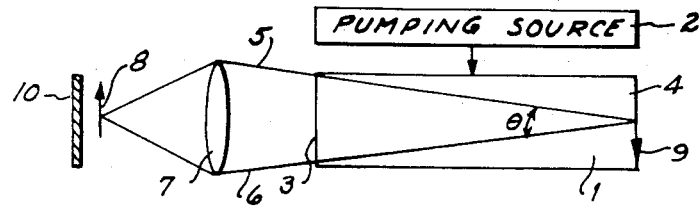
FIG. 1 is a block diagram of the preferred form of laser illuminator and image amplifier of the present invention.

Referring in detail to FIG. 1 of the drawings, there is shown a block diagram of the preferred form of laser illuminator and image amplifier according to the present invention. Amplification is provided by a body of laser medium 1, preferably having high gain, uniform optical properties and a large Fresnel number. For example, the laser medium 1 may be a high-gain gaseous laser medium contained in a glass tube or other suitable envelope. For example, the body of laser medium 1 may be a tube of copper vapor which may have a gain of up to 400 db/meter depending on the concentration of copper atoms and the intensity with which they are pumped. Other gaseous laser media suitable for use in the present invention are lead vapor which has a gain of about 600 db/meter, nitrogen with a gain of about 80 db/meter, neon and other high-gain gaseous laser media well-known to those skilled in the art. It will be appreciated that, if it is decided to use a laser medium such as nitrogen which emits in the ultraviolet portion of the spectrum, it will be necessary to use a fluorescent projection screen or other suitable technique in order to make the amplified image visible to the human eye.

Alternatively, it will be appreciated that any of high-gain liquid laser media might be used in the laser illuminator and image amplifier of the present invention. For example, the laser medium 1 shown in FIG. 1 may be an organic dye solution such as rhodamine 6G, rhodamine B or fluorescein dye. Such liquid laser media can be made to exhibit gain factors of about 50 db/meter when pumped by another laser.

The advantages of gaseous and liquid laser media for the purposes of the present invention are that they exhibit substantially uniform optical properties and substantially uniform coefficients of gain over their entire cross-sections. These characteristics provide an amplified image which is free of optical distortions and which is substantially uniformly amplified over its entire area. By contrast, solid state laser media presently known to those skilled in the art such as, for example, ruby, yttrium-aluminum-garnet and others, do not have uniform optical properties and uniform coefficients of gain over their entire cross-sections. However, it will be appreciated that the principles of the present invention are not limited to the use of gaseous and liquid laser media. Solid laser media may be employed within the spirit and scope of the invention provided adequate uniformity of optical properties and coefficients of gain can be achieved.

An additional advantage of certain gaseous media for the purposes of the present invention is that they may be readily pumped by means of electrical dishcarge within the laser medium itself. Further, gaseous laser media can generally be operated in the pulsed mode, and thus lend themselves readily to use in applications such as stroboscopic microscopy and the high speed photographic recording of nonperiodic microscopic motions.

Referring again to the block diagram of FIG. 1, a pumping source 2 is provided for pumping the laser medium 1 to produce the required population inversion for light amplification by simulated emisssion of radiation. In the preferred form of the present invention, the pumping source 2 comprises apparatus for producing an electrical discharge within the gaseous laser medium 1. It will be appreciated, however, that other types of pumping sources may be used within the spirit and scope of the present invention. For example, the pumping source 2 may be a continuous or pulsed optical pumping source.

In any case, the pumping source 2 must be capable of producing sufficiently intense excitation of the body of laser material 1 to cause super-radiant laser emission. Superradiant emission will occur when the overall gain of the body of laser material 1, as determined by the nature and concentration of the laser material itself and the intensity of the pumping, is sufficiently high that substantial light amplification occurs during a single pass through the body of laser material 1. In other words, super-radiant emissions exhibit some of the directional and coherent properties of laser light. More specifically, super-radiant emissions are characterized by the fact that they emerge from both ends of a laser gain tube in a fairly intense cone, the spread angle of which is determined by the aspect ratio of the tube.

Referring to FIG. 1, the super-radiant emissions emerge from end 3 of the body of laser material 1 in a solid cone defined by rays 5 and 6. The spread angle $\theta$ of the cone is determined by the aspect ratio D/L of the body of laser material 1. More particularly, the spread angle $\theta$ is defined by the relatinship $\theta = 2 \sin^{-1} D/2L$. It will be appreciated by those skilled in the art that there are also super-radiant emissions from end 4 of the body of laser material 1, however these are not shown in FIG. 1.

A lens 7 is disposed in the path of the super-radiant emissions and serves to focus them on the object to be illuminated as represented by the small arrow 8 shown in FIG. 1. In the preferred form of the present invention, the lens 7 is of sufficient diameter and is placed to intercept the entire cone of super-radiant emissions defined by rays 5 and 6 so that the entire super-radiant output from end 3 of laser medium 1 is used to illuminate the object 8. Lens 7 also serves to collect the light reflected or scattered from the object 8 and to return it through the body of laser material 1 to form an image inndicated by the arrow 9 in FIG. 1. In the preferred form of the present invention, the image 9 is formed at or near the end surface 4 of the body of laser material 1 and occupies the entire cross-sectional area of end 4 for most efficient utilization of the volume of the body of laser medium 1. This condition is achieved when $p = dl/D$, where $p$ is the distance between lens 7 and end 4 of the body of laser material 1 and $d$ is the diameter of lens 7. Optimum resolution and intensity are achieved when the components of the system are arranged to produce the symmetric conditions of illumination and amplification shown in FIG. 1.

The field of view and resolution of the laser illuminator and image amplifier shown in FIG. 1 are related to the Fresnel number, N, of the gain tube 1 and the numerical aperture, NA, of the illuminating collecting lens 7. More particularly, the resolution R, of the system is given by $$R = \lambda 2\ NA\ /2$$

where $\lambda$ is the operating wave length of the gain tube 1. The Fresnel number, N, of the gain tube 1 is defined by $$N = D^2/4L\lambda$$

The field of view, FV, is defined by $$F.V. \approx D^2/2L[1-NA^2/NA^2]^{1/2}$$

Hence, it will be seen that if $4NA<<1$, $FV/R = D^2/L\lambda = 4N$

In the preferred form of the present invention, the Fresnel number, N, is relatively large. For example, in a typical application of the present invention, the Fresnel number of the gain tube 1 will generally be on the order of 20 or greater. The Fresnel number is related to the number of spatial modes in which the gain tube 1 can amplify and the number of amplified modes is a measure of the number of resolution elements that the system can resolve. For example, a Fresnel number of 20 indicates about 400 modes of transmission which in turn indicates an image of about 400 resolution elements.

Inasmuch as the aspect ratio, D/L of the gain tube 1 is a factor determining the Fresnel member, it will be appreciated that the aspect ratio should be large in order to produce an amplified image having a large number of resolution elements. More particularly, the aspect ratio, D/L of the typical gain tube used in the laser illuminator and image amplifier of the present invention is on the order of 1/200 or greater.

If the gain of the body of laser material 1 is high, the contrast between two resolution elements of the image 9 will be proportional to the reflectivities of the corresponding resolution elements of the object 8. More particularly, the contrast, C is given by $$C = R_1 e^{2\alpha L} + e^{\alpha L}/r_2 e^{2\alpha L} + e^{\alpha L} = r_1 e^{2\alpha L} +$$
$$1/r_2 e^{2\alpha L} + 1 \simeq r_1/r_2 \text{ for } \alpha L > 1$$

where $r_1$ and $r_2$ are the reflectivities of two resolution elements of the object 8 and $\alpha$ is the gain of the laser medium in db/m. It will be noted that the contrast, $C$, is preserved even when the gain tube 1 is driven into saturation as long as the overall gain, $\alpha L$, of the tube 1 is substantially greater than unity. It is understood that for diffusely reflecting objects the reflected energy collect depends on the numerical aperture of the lens 7 as well as the relative albedos of the diffusely reflecting surfaces.

Referring again to FIG. 1, a mirror 10 may be placed behind the object 8 if it is desired to operate the apparatus as a "bright field" device. Bright field operation is desirable when transparent or translucent objects are to be viewed. On the other hand, if "dark field" operation is desired, the mirror 10 is simply removed and/or replaced by a non-reflecting background.

While it is preferable that the single pass gain of the body of laser material 1 be relatively high, the minimum gain requirements for purposes of the present invention are relatively modest. For example, in order that the amplified image 9 be adequately visible and intelligible over the single pass super-radiant illumination emerging from the end 4 of gain tube 1, the intensity of the amplified image 9 should be at least about twice the intensity of the super-radiant emission. This means that the overall single pass gain of the system should be about 3db allowing for a variety of losses such as the reflection losses at the various interfaces and the loss resulting from the fact that, for most objects 8, only a small fraction of the illuminating light will be reflected back through the lens 7 and gain tube 1. However, in practice, it is relatively easy to obtain single pass gains of 20db or more when high gain media such as copper vapor are employed. In such a case, the intensity of the amplified image 9 would be 100 times that of the single pass super-radiant emission from end 4 of the gain tube 1.

Figure 2:
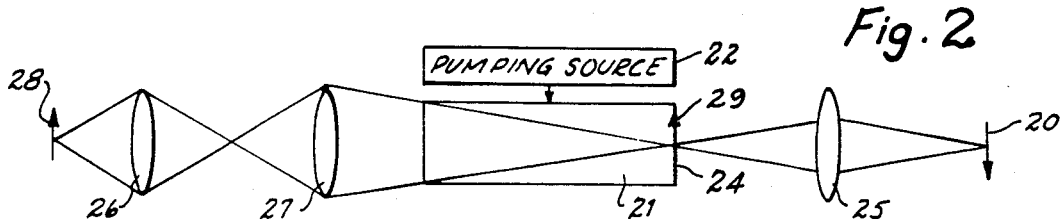
FIG. 2 is a block diagram of a modified form of laser illuminator and image amplifier according to the present invention.

FIG. 2 of the drawings is a block diagram of a modified form of laser illuminator and image amplifier according to the present invention. The apparatus of FIG. 2 includes a body of laser material 21 and pumping source 22 as in FIG. 1. However, in FIG. 2, an adjustable compound lens system, indicated by lenses 26 and 27, is used to focus the super-radiant emissions on the object 28 and to collect the light reflected or scattered from object 28 and return it through gain tube 21 to form the amplified image 29 at the far end 24 of the gain tube 21. The adjustable compound lens system 26, 27 provides a convenient way for optimizing resolution, amplification and field of view, as described above in connection with FIG. 1.

The apparatus of FIG. 2 also includes a projection lens 25. It will understood by those skilled in the art that the projection lens 25 may also be an adjustable compound lens system as in the case of the adjustable lens system 26, 27. The projection lens 25 is simply used to project the amplified image 29 so as to form a projected image 20.

Depending upon the placement and focal length of projection lens 25, the projected image 20 may be either very large or very small. For example, if projection lens 25 is placed relatively close to amplified image 29 in relation to its focal length, the projected image 20 will be formed at a relatively great distance from lens 25 and will be proportionately large. Such an arrangement would be useful for projection microscopy. On the other hand, if lens 25 is placed relatively far from amplified image 29 relative to its focal length, the projected image 20 will be proportionately reduced in size. If the projected image 20 is sufficiently reduced in size, its intensity will be sufficiently great to vaporize various materials in a pattern corresponding to that of the image. Hence, such an arrangement might be useful, for example, in the manufacture of semiconductor microcircuits.

Figure 3:
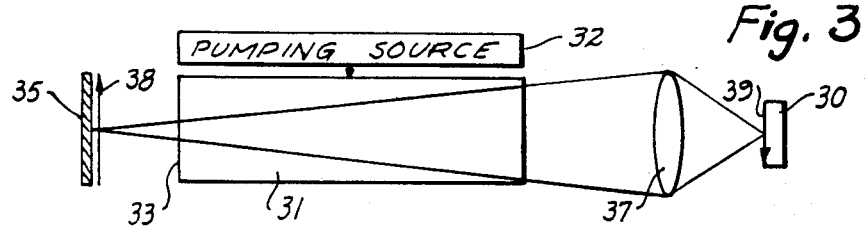
FIG. 3 is a block diagram of etching apparatus utilizing the laser illuminator and image amplifier of the present invention.

Referring now to FIG. 3 of the drawings, there is shown a block diagram of another modified form of apparatus according to the present invention. The apparatus of FIG. 3 is designed to produce small intense amaplified images for the purpose of etching a block of material 30 placed at the image plane. The body of high gain laser material 31 and pumping source 32 are similar to those described above in connection with FIGS. 1 and 2. A plain mirror 35 is placed adjacent the end 33 of the gain tube 31. The object 38 is placed adjacent the mirror 35. If, for example, the apparatus of FIG. 3 were to be used for the manufacture of semiconductor microcircuits, the object 38 might be a sheet having opaque and transparent portions representing the artwork for a particular etching step in the manufacture of a microcircuit.

The super-radiant illumination emitted from end 33 of gain tube 31 is reflected by the mirror 35 through the transparent portions of the object 38 and is imaged on block 30 by lens 37. The size and intensity of image 39 may be adjusted by adjusting the positions of lens 37 and block 30 relative to object 38. An adjustable compound lens system may be substituted for projection lens 37 in order to facilitate the optimization of resolution and intensity as described above in connection with FIGS. 1 and 2. As in the case of the apparatus shown in FIGs. 1 and 2, the field of view and resolution of the illuminator and image amplifier shown in FIG. 3, depends upon the Fresnel number of the gain tube 31 and the numerical aperture of the lens 37.

Figure 4:
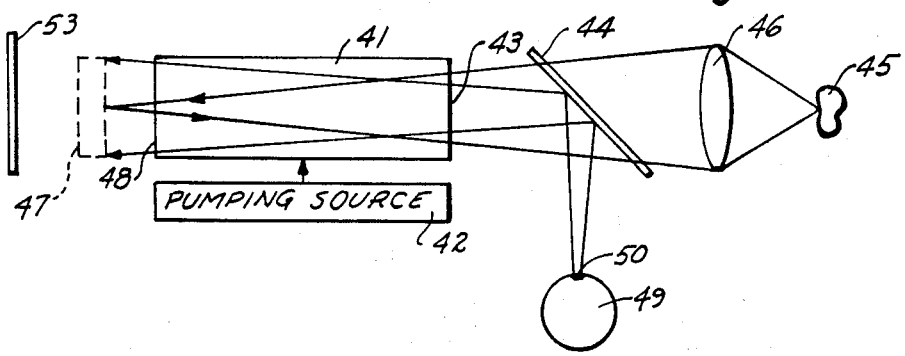
FIG. 4 is a block diagram of a holographic microscope utilizing the present laser illuminator and image amplifier.

FIG. 4 is a block diagram of a holographic microscope utilizing the laser illuminator and image amplifier of the present invention. The apparatus of FIG. 4 includes a body of high gain laser material 41 and a pumping source 42 as in the case of the apparatus described in FIGS. 1-3. The super-radiant illumination emerging from end 43 of gain tube 41 is split into two beams by the beam splitter 44 which may be a partially transmitting mirror, for example. One beam is focussed on the object 45 by lens 46 which also serves to collect the light reflected or scattered from object 45 and return it through the beam splitter 44 and gain tube 41 to form an image in the volume 47 adjacent the opposite end 48 of the gain tube 41. The other beam is directed by beam splitter 44 onto a convex spherical reflector 49 which has a sufficiently short radius of curvature that only the light falling on a single resolution element, indicated by small spot 50 in FIG. 4, is reflected back via beam splitter 44 through laser medium 41 to provide a spatially coherent amplified reference beam. In order to accomplish this mode selecting function, the maximum radius, r, of spherical reflector 49 is defined by $$r < 2\lambda P^2/D^2$$

where $P$ is the distance between the end surface 48 of gain tube 41 and the surface of spherical reflector 49 and $P >> r$. The amplified reference beam interferes with the amplified image of object 45 in region 47 so as to produce a holographic recording on photographic film 53. Reconstruction of the object can be achieved in the usual way.

Unlike other holographic systems the scattered light from the object as well as the reference beam is amplified coherently. As a result, the illumination of the object can be weak so as not to destroy or alter sensitive samlpes, yet after amplification having adequate intensity for recording the hologram. By viewing the hologram with an eyepiece, one can examine a microscopic object in depth where the high NA of the illuminator and large depth of field of the hologram are combined.

In addition, microscopic motion pictures are possible due to the high peak intensity per pulse (~30–100 KW), high pulse repetition rates ($\approx$ 3 KC) and short pulse lengths (2~20 nsec). For example, if the film speed were 16 frames/sec, the lateral hinge displacement would be ~$3 \cdot 10^{-7} x$ film size. For 100 mm film, this corresponds to motion over film resolution element for film of $10^4$ lines/mm resolution; therefore there will be no blurring. Microscopic motion of velocities up to ~ $\lambda/4/20$ nsec = 500 cm/sec can be observed.

Certain microscopic objects which do not have sufficient reflectivity variation to be observed cause phase shifts in the light radiation passing through them or reflected from them. These phsae shifts can be made visible by being converted into intensity variations in the form of interference fringes.

Figure 5:
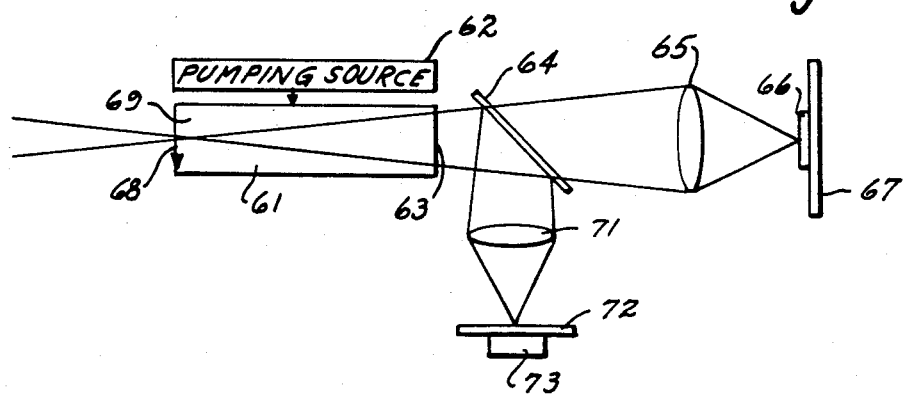
FIG. 5 is a block diagram of an interference microscope utilizing the present laser illuminator and image amplifier.

In FIG. 5 of the drawings there is shown an interference microscope utilizing the laser illuminator and image amplifier of the present invention. The super-radiant illumination emerging from end 63 of the body of high gain laser material 61 is split into two beams by the beam splitter 64 which may be a partially transmitting mirror, for example. One beam is focussed by lens 65 onto object 66 which is carried by plain mirror 67. The lens 65 also serves to collect the light reflected or scattered from object 66 and mirror 67 and return it through the body of laser material 61 to form an image 68 near the end 69 of the gain tube 61.

The other beam is focussed by lens 71 onto plain mirror 72 which is mounted on a device 73 which is capable of effecting fine adjustment of the position of mirror 72. In the preferred form of apparatus shown in FIG. 5, the device 73 is a piezoelectric ceramic. The lens 71 also serves to collect the light reflected from mirror 72 and return it via beam splitter 64 through the gain tube 61 to form an image near the end 69 of tube 61. The piezoelectric ceramic 73 is then used to adjust the path lengths of the two beams.

If the lenses 65 and 71 are well matched, and the paths are equalized, the fringed contours observed at 69 will be straight. If the lenses are not matched, the fringe contours will be circular. In either case, phase shifts due to the object 66 will be observed as deviations in the fringe contours. Angular adjustment of the mirrors 67 and 72 can be used to change the frequency of the interference fringe contours. As in the apparatus described above in connection with FIGS. 1–4, the interference microscope of FIG. 5 will permit high-power projection with weak illumination of the object 66.

While the principles of the present invention have been described by reference to a preferred embodiment and several modifications thereof, it will be appreciated by those skilled in the art that certain modifications and adapatations of the apparatus may be made within the spirit and scope of the present invention.

For example, the super-radiant laser illuminator and image amplifier of the present invention can be modified in such a way as to produce color images. This may be accomplished by using a second gain tube placed optically in series with the first gain tube and operating in a different wavelength range from the first gain tube. In general, the second gain tube will be of a different laser material from the first tube, although this is not strictly necessary. In fact, certain laser materials such as, for example, lead vapor, offer two spectral transitions having sufficient gain for use in the apparatus of the present invention. If two gain tubes are used in series, they will not have to be electronically synchronized since the visual persistence of the human eye will accomplish the desired result if repetition rates in excess of 16cps are employed.

Further, although the principle of the present invention has been illustrated by reference to embodiments in which a single laser gain tube is used to provide both illumination of the object and amplification of the image, it will be appreciated that separate laser gain tubes can be used for illumination and amplification within the scope of the present invention. Alternatively, illumination can be provided by a light source other than a laser.

It will be apparent that other modifications and adaptations of the disclosed apparatus may be made without departing from the spirit and scope of the invention as defined with particularity in the appended claims.

What is claimed is:

1. A holographic laser illuminator and image amplifier comprising:

a superradiant laser medium having a first end and a second end, said laser medium being of a size and shape to permit emission of light radiation in a plurality of off-axis modes;

means for pumping said superradiant laser medium to cause spontaneous superradiant emission of light from said laser medium;

means disposed adjacent said first end of said laser medium for splitting the light spontaneously emitted therefrom into a first beam and a second beam;

optical means for focusing said first beam on an object to be illuminated and for collecting and returning the light reflected from the object illuminated through said laser medium to form an image of the object illuminated in a region adjacent said second end of said laser medium, said image being non-regeneratively amplified by a single passage of the light reflected from said object through said laser medium;

mode selecting means disposed in the path of said second beam for selecting a single mode of said second beam so as to provide a spatially coherent reference beam, and for returning said reference beam through said laser medium to interfere with the image formed by said optical means, said reference beam being non-regeneratively amplified by a single passage of said reference beam through said laser medium; and photographic recording means disposed adjacent the region of the image formed by said optical means for recording the interference pattern produced by the amplified image and the amplified reference beam.

2. The holograpahic laser illuminator and image amplifier of claim 1 wherein said mode selecting means comprises a convex reflector having a radius of curvature which is sufficiently short that only a single mode of said second beam is returned by said convex reflector through said laser medium to provide a spatially coherent amplified reference beam.

3. The holographic laser illuminator and image amplifier of claim 1 wherein the overall single pass gain of said laser medium is at least 3db.

4. The holographic laser illuminator and image amplifier of claim 1 wherein said laser medium is optically uniform.

5. The holographic laser illuminator and image amplifier of claim 4 wherein said laser medium is a fluid laser medium.

6. The holographic laser illuminator and image amplifier of claim 5 wherein said laser medium is a gas and wherein said pumping means comprises means for producing an electrical discharge in said gas.

7. The holographic laser illuminator and image amplifier of claim 1 further comprising means to cause pulsed emission of light radiation from said laser medium.

8. The holographic laser illuminator and image amplifier of claim 1 wherein the ratio of the diameter of said laser medium to the length of said laser medium is greater than 1 to 200.

9. The holographic laser illuminator and image amplifier of claim 1 wherein the Fresnel number of said laser medium is greater than 20.

10. The holographic laser illuminator and image amplifier of claim 1 wherein the ends of said laser medium are substantially transparent and non-reflecting.

11. A laser illuminator and image amplifier comprising:
a superradiant laser medium having a first end and a second end, said laser medium being of a size and shape which permits the emission of radiation in a plurality of off-axis modes;
means for pumping said superradiant laser medium to cause spontaneous superradiant emission of light radiation from said laser medium;
means disposed adjacent said first end of said body of laser material for splitting the light spontaneously emitted from said laser medium into a first beam and a second beam;
a first plane mirror disposed behind the object to be illuminated;
first optical means for focusing said first beam on the object to be illuminated and said first plane mirror, and for collecting and returning the light reflected from the object and said mirror through said laser medium to form a first image adjacent said second end of said body of laser material, said first image being non-regeneratively amplified by a single passage of the light reflected from said object and said first mirror through said laser medium; a second plane mirror;
second optical means for focusing said second beam on said second plane mirror, and for collecting and returning the light reflected from said second mirror through said laser medium to form a second image substantially coplanar with said first image, said second image being non-regeneratively amplified by a single passage of the light reflected from said second mirror through said laser medium; and
means for adjusting the position of said second plane mirror so as to equalize the paths of said first beam and said second beam and thereby control the interference fringes caused by the interaction of said first image and said second image.

12. The apparatus of claim 11 wherein the overall single pass gain of the apparatus is at least 3db.

13. The apparatus of claim 11 wherein said laser medium is optically uniform.

14. The apparatus of claim 13 wherein said laser medium is a fluid laser medium.

15. The apparatus of claim 14 wherein said laser medium is a gas and wherein said pumping means comprises means for producing an electrical discharge in said gas.

16. The apparatus of claim 11 wherein the Fresnel number of said laser medium is at least 20.

17. The apparatus of claim 11 wherein the ends of said laser medium are substantially transparent and non-reflecting.

* * * * *